(12) United States Patent
Sintov et al.

(10) Patent No.: US 10,186,825 B2
(45) Date of Patent: Jan. 22, 2019

(54) GAS SLAB LASER

(71) Applicant: Soreq Nuclear Research Center, Yavne (IL)

(72) Inventors: Yoav Sintov, Petach Tikva (IL); Zeev Zalevski, Rosh HaAyin (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 0 days.

(21) Appl. No.: 15/739,735

(22) PCT Filed: Mar. 21, 2016

(86) PCT No.: PCT/IB2016/051582
§ 371 (c)(1),
(2) Date: Dec. 24, 2017

(87) PCT Pub. No.: WO2016/207737
PCT Pub. Date: Dec. 29, 2016

(65) Prior Publication Data
US 2018/0191123 A1    Jul. 5, 2018

Related U.S. Application Data

(60) Provisional application No. 62/183,243, filed on Jun. 23, 2015.

(51) Int. Cl.
| | | |
|---|---|---|
| *H01S 3/03* | (2006.01) | |
| *H01S 3/038* | (2006.01) | |
| *H01S 3/223* | (2006.01) | |
| *H01S 3/097* | (2006.01) | |

(52) U.S. Cl.
CPC .......... *H01S 3/0388* (2013.01); *H01S 3/0315* (2013.01); *H01S 3/097* (2013.01); *H01S 3/2232* (2013.01)

(58) Field of Classification Search
CPC ....... H01S 3/097; H01S 3/2232; H01S 3/0388
USPC ............................................... 372/87, 61, 62
See application file for complete search history.

(56) References Cited

U.S. PATENT DOCUMENTS

| | | | | |
|---|---|---|---|---|
| 4,719,639 A | | 1/1988 | Tulip | |
| 4,875,218 A | * | 10/1989 | Hongo | H01S 3/0305 372/64 |
| 2005/0106893 A1 | * | 5/2005 | Wilk | C23C 16/0245 438/758 |
| 2006/0029116 A1 | * | 2/2006 | Shackleton | H01S 3/0315 372/55 |
| 2007/0195839 A1 | * | 8/2007 | Monty | H01S 3/0315 372/38.05 |

(Continued)

FOREIGN PATENT DOCUMENTS

RU    2237956    10/2004

OTHER PUBLICATIONS

PCT Search Report and Written Opinion PCT/IB2016/051582, dated Jul. 18, 2016.

(Continued)

*Primary Examiner* — Tuan Nguyen
(74) *Attorney, Agent, or Firm* — Dekel Patent Ltd.; David Klein

(57) ABSTRACT

A microwave excited gas slab laser comprising a waveguide wherein the electrodes are covered with multi-layered stripes either forming a photonic band-gap or having a refractive index lower than 1.

17 Claims, 5 Drawing Sheets

(56) References Cited

U.S. PATENT DOCUMENTS

2013/0308673 A1    11/2013   Engel

OTHER PUBLICATIONS

Avi Shahadi, "Microwave Excited CO2 Lasers", Mar. 1, 2001, PhD thesis.
Jan Kischkat et al., "Mid-infrared optical properties of thin films of aluminum oxide, titanium dioxide, silicon dioxide, aluminum nitride, and silicon nitride", Applied Optics vol. 51, Issue 28, pp. 6789-6798 (2012).
Ro Miles et al., "Propagation losses at 10.6 µm in hollow-core rectangular waveguides for distributed feedback applications", IEEE Journal of Quantum Electronics ( vol. 15, Issue: 12, Dec. 1979).

\* cited by examiner

Freq(MHz)

$P_{opt}$ (Torr)

Power (Watt)

GAS SLAB LASER

FIELD OF THE INVENTION

The present invention relates to a structure and methods for achieving a higher RF power load in diffusion-cooled gas slab laser plasma.

BACKGROUND OF THE INVENTION

Diffusion-cooled, gas-discharge slab lasers are characterized by output power of several watts per unit area of discharge. Slab gas lasers based on large area electrodes confining a $CO_2$ laser mixture, driven by radio-frequency (RF) power supplies (FIG. 1A), are currently delivering over three kilowatts of power with excellent beam quality, due to a special optical resonator, allowing for maximum exploitation of the discharge gain volume for a single mode beam amplification.

In order to maximize the discharge cooling, which is of prime importance for electrically excited gas lasers, the planar discharge width is of the order of the planar electrodes gap, which is typically 1-2 mm. In addition, the discharge electrodes are used as an optical waveguide for the amplified laser beam. Stabilization of the discharge is achieved by feeding the discharge with over 100 MHz RF power, with a wavelength comparable to the electrodes longitudinal dimensions and thereby homogeneous discharge is achieved.

The laser output power is limited by the allowed RF power load in the discharge per unit area. This power load is inversely proportional to the electrodes spacing. Exceeding the power load limitation for a given electrodes spacing, results in laser deterioration, due to thermal deleterious effects.

However, further reduction of the electrode spacing for allowing higher RF power load in the discharge is prohibited due to the following reasons:

1) At 100-200 MHz excitation frequency, it is well known to those skilled in the art that the discharge plasma is divided into two sections in a stable, typical RF discharge (FIG. 1B): depletion layers located in the vicinity of the electrodes, in which positive ions are present and electrons are drifted to the electrodes, prohibiting the possibility for laser gain, and a positive column, layer or zone in which neutral plasma is achieved and a laser gain is created, due to efficient electron excitation of the active gas.

The depletion layers width is inversely dependent on the RF excitation frequency. At 125 MHz excitation frequency, the depletion layers width is of the order of 400 μm. Reducing the electrode gap toward this value will practically reduce the width of the gain holding plasma column and the laser efficiency will be reduced.

2) The electrodes are used as an optical waveguide for the amplified laser beam (FIG. 1C). The electrodes are usually metallic with a dielectric layer implemented on its surface in order to avoid contamination of the plasma and corrosion of the electrodes. It is well known to those who are skilled in the art that the hollow waveguide losses, due to leaky guided modes, are proportional to $1/d^3$, where d is the electrode spacing (Degnan J. J. The Waveguide Laser: A Review, Appl. Phys., 1976, v. 11, p. 1-33.). Therefore, reducing the electrodes spacing will result in an extensive loss and laser efficiency deterioration.

One of the well-known ways for allowing electrode space reduction and alleviating the first limitation is by increasing the RF frequency. Attempts have been made to excite gas lasers with microwave (MW) discharges, but the waveguide-loss-limited electrode spacing, on the order of 1-2 mm, did not allow for stable CW microwave discharges (due to the narrow depletion layers) and pulsed operation was utilized for achieving stable plasma. In order to allow for stable CW microwave (MW) discharges, a reduction of the electrode spacing is required.

Therefore, reduction of the electrodes spacing for allowing for higher RF power load in the discharge and increasing the laser power per unit electrodes area, necessitates the increase of the excitation RF frequency towards the MW frequency range. In addition, a way for alleviating the laser waveguide losses, due to the reduction of the electrode spacing, is required.

As mentioned before, reducing the electrode spacing in the traditional leaky waveguide, as shown in FIGS. 1A-1C, will result in extensive waveguide losses. As an example, a simulation of a leaky waveguide made of ZnSe (zinc selenide) (refractive index n=2.4 @$\lambda$=10.6 μm) confining a $CO_2$ plasma gain volume with a width of 110 μm, is shown in FIGS. 2A-2C. The leaky waveguide losses amount to over 90% loss of power per 1 m of 10.6 μm light propagation through the waveguide.

SUMMARY OF THE INVENTION

The present invention relates to a method and apparatus for achieving high power load per unit in the electrode area in slab lasers by reducing the electrode gap. In one embodiment, the method includes a combination of high frequency discharge excitation in the MW range and a special optical waveguide at 10.6 μm wavelength, based on a one-dimensional (1D) photonics band-gap waveguide or a waveguide composed of dielectric walls made of materials that have a refractive index lower than 1, which is approximately the refractive index of the laser plasma. In one embodiment, these materials are transparent to the MW wavelength and are not affected by the laser plasma (plasma heat damages, possible degradation due to plasma emission of deleterious particles and photons). Non-limiting examples of such materials are ceramics such as aluminum oxide ($Al_2O_3$) or beryllium oxide (BeO).

BRIEF DESCRIPTION OF THE DRAWINGS

The present invention will be understood and appreciated more fully from the following detailed description, taken in conjunction with the drawings in which:

FIGS. 1A-1C are schematic illustrations of the prior art slab laser discharge section, in which FIG. 1A illustrates the excitation setup of the discharge. FIG. 1B illustrates the transverse cross-section of the RF a discharge structure, and FIG. 1C illustrates the longitudinal cross section of the laser cavity formed by cavity mirrors and laser beam waveguide formed by the electrodes.

FIGS. 2A-2C are illustrations of a leaky waveguide made of ZnSe (zinc selenide) planar structure, in which FIG. 2A illustrates the refractive index contour map @ 10.6 μm, FIG. 2B illustrates the refractive index profile cross section, and FIG. 2C illustrates 10.6 μm light propagation and losses along the waveguide (this is an example of a leaky waveguide with dielectric walls made of a material with a refractive index>1).

planar structure, in which FIG. 3A illustrates a waveguide one-dimensional cross-section, and FIG. 3B illustrates 10.6 µm light propagation along the waveguide.

DETAILED DESCRIPTION OF EMBODIMENTS

Figures 3A, 3B:
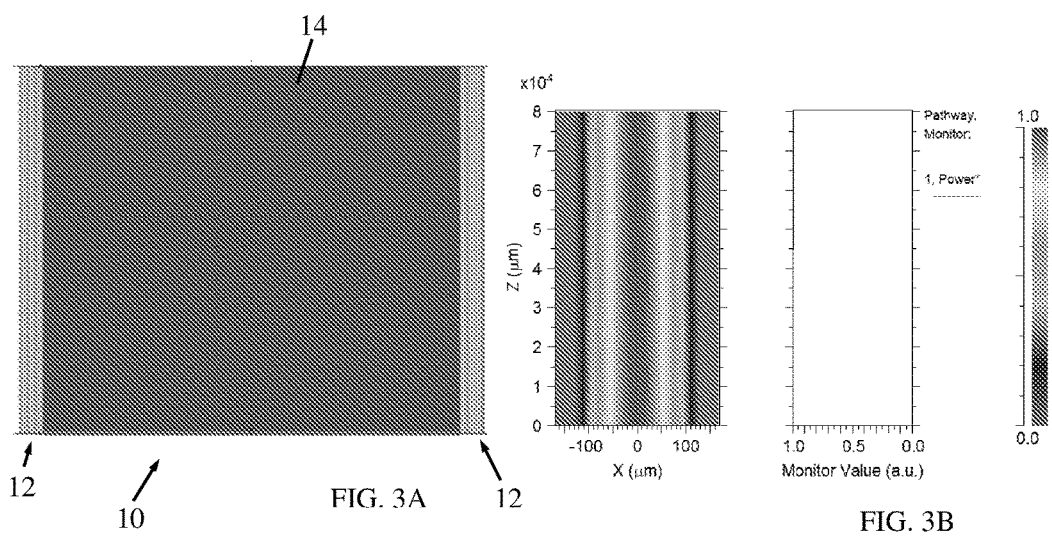
FIGS. 3A-3B are simplified illustrations of a bandgap structured waveguide for a gas slab laser, constructed and operative in accordance with an embodiment of the invention, made of an aluminum oxide/germanium ($Al_2O_3$/Ge)

Reference is now made to FIGS. 3A-3B, which illustrate a bandgap structured waveguide 10 for a gas slab laser, constructed and operative in accordance with an embodiment of the invention, made of an aluminum oxide/germanium ($Al_2O_3$/Ge) planar structure.

Figure 1A:
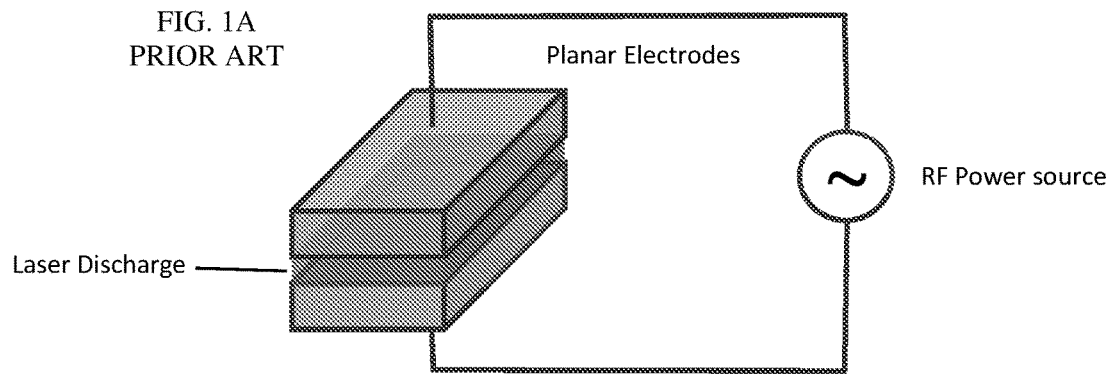
Figure 1B:
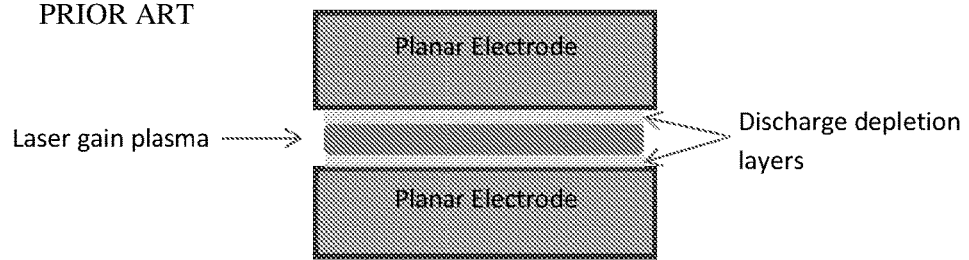
Figure 1C:
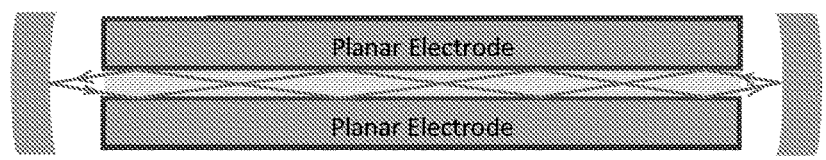
Figure 2A:
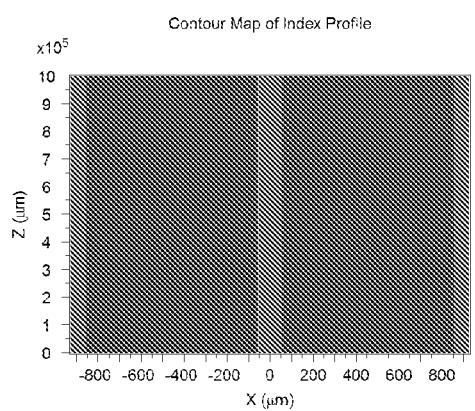
Figure 2B:
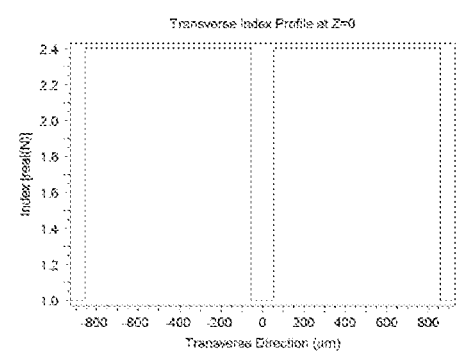
Figure 2C:
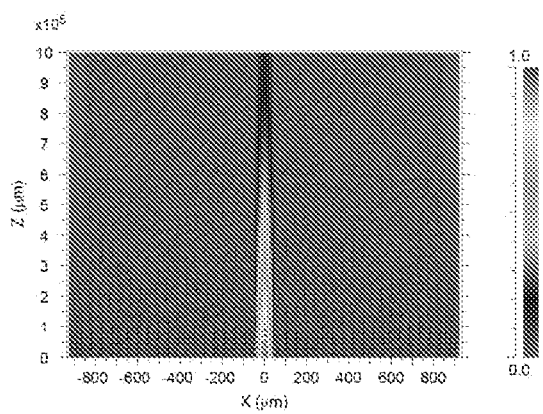

The waveguide 10 includes dielectric electrodes 12 that have a photonic band-gap structure, which prohibits (at the selected wavelength, relevant for the laser operation) light propagation in the dielectric electrodes material. In a particular embodiment, dielectric electrodes 12 include spatially alternating layers of two different materials—$Al_2O_3$ and Ge (aluminum oxide and germanium)—have been utilized (with refracting indices of 0.67-i0.04 and 4, respectively) (FIG. 3A) for $\lambda$=10.6 µm wave propagation. A layer width of $\lambda/(4-n)$ was chosen for each material type, where n stands for the refractive index of the relevant material. The bandgap structure confines a gap 14, such as a one dimensional 250 µm gap, in which the $CO_2$ laser discharge takes place. In the present embodiment ~1% loss is shown for a single pass (FIG. 3B), a marked improvement (almost two orders of magnitude) over the leaky waveguide structure shown in FIGS. 2A-2C. In this embodiment, the first layer of the electrode is made of $Al_2O_3$, due to its large relative width and the endurance of $Al_2O_3$ to both possible high temperatures and the deleterious plasma byproducts.

In this manner, the effective hollow waveguide losses are no longer dominated by the hollow leaky waveguide losses, as in the prior art structure, but by the photonic bandgap induced losses which are markedly lower.

As a result, the 1D photonic band-gap structure allows for the reduction of the electrodes spacing to several hundred micrometers, without increasing the waveguide losses. This reduction allows for an order of magnitude higher RF power investment in a laser plasma, compared to prior art RF excited slab lasers, without deteriorating the laser efficiency.

Another example for the electrode material, albeit inferior to the alumina and germanium structure, is that of spatially alternating layers of ZnSe (zinc selenide) and ZnTe (zinc telluride), which have refracting indices of 2.4 and 2.682, respectively for $\lambda$=10.6 µm wave propagation. The bandgap structure may confine a one dimensional 110 µm gap, in which the $CO_2$ laser discharge takes place. This leads to about 5% loss, still much less than the losses exhibited in the example shown in FIG. 2, in which the electrodes were made by ZnSe only.

Figure 4:
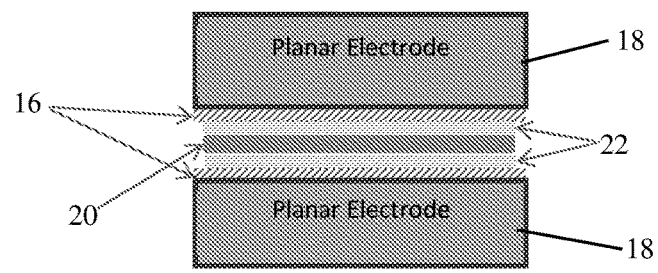
FIG. 4 is a simplified illustration of a dielectric waveguide for a gas slab laser with $Al_2O_3$ stripes as the plasma confining walls.

Another method of allowing for the reduction of the electrodes spacing is by using a dielectric material with a refractive index lower than 1 as the plasma confining walls. Using such materials will allow for total internal reflection of the 10.6 µm light from the confining walls which assures truly guided waves and low propagation loss of the 10.6 µm laser radiation. Such material is, for example, $Al_2O_3$, which has a lattice absorption at several wavelengths, among which are: 15.7, 17.6, 22.6, and 26 µm [Miles, R., Grow, R. W, "Propagation losses at 10.6 µm in hollow-core rectangular waveguides for distributed feedback applications," IEEE J. Quantum Electronics, Vol. 15 Issue 12, pp. 1396-1401 (1979)], and therefore induce a refractive index of n=0.67-i0.035 at 10.6 µm. By utilizing the beneficial characteristic of such materials, a non-leaky waveguide can be implemented with relatively low propagation loss. An example of a waveguide with $Al_2O_3$ confining walls is illustrated in FIG. 4. In this embodiment, dielectric stripes 16 (such as $Al_2O_3$ stripes) are disposed on two planar electrodes 18, such as cooled metal electrodes. One non-limiting distance between the alumina stripes is 0.15 mm, allowing for true low loss guided modes in conjunction with high heat evacuation rate from the discharge. Calculations show that such a waveguide has a loss of ~0.5%/cm. The laser gain plasma is in a gap 20 between the stripes 16. Discharge depletion layers 22 are between each of the stripes and the laser gain plasma.

Another material that can be even more beneficial as a dielectric waveguide for the laser radiation is BeO (beryllium oxide). The refractive index of BeO at 10.6 µm is 0.055-i2.8, allowing for even lower propagation loss in a narrow discharge layer. According to calculations, a waveguide with the same dimensions described before (FIG. 4) have ~0.1%/cm loss.

In addition, increasing the RF frequency towards the MW range, for example to 2.45 MHz, allows for a stable discharge with thinner depletion layers and a stable plasma column. The stability is synergistically augmented by the presence of the dielectric waveguide stripes, since they form additional capacitive agents in series to the plasma column and act as additional stabilizing ballasting impedances to the plasma depletion layers.

Compact efficient and low cost MW sources are readily available in the market, which lowers the price and size of the gas laser source, which is at present limited by the cumbersome expensive RF sources.

Figure 5:
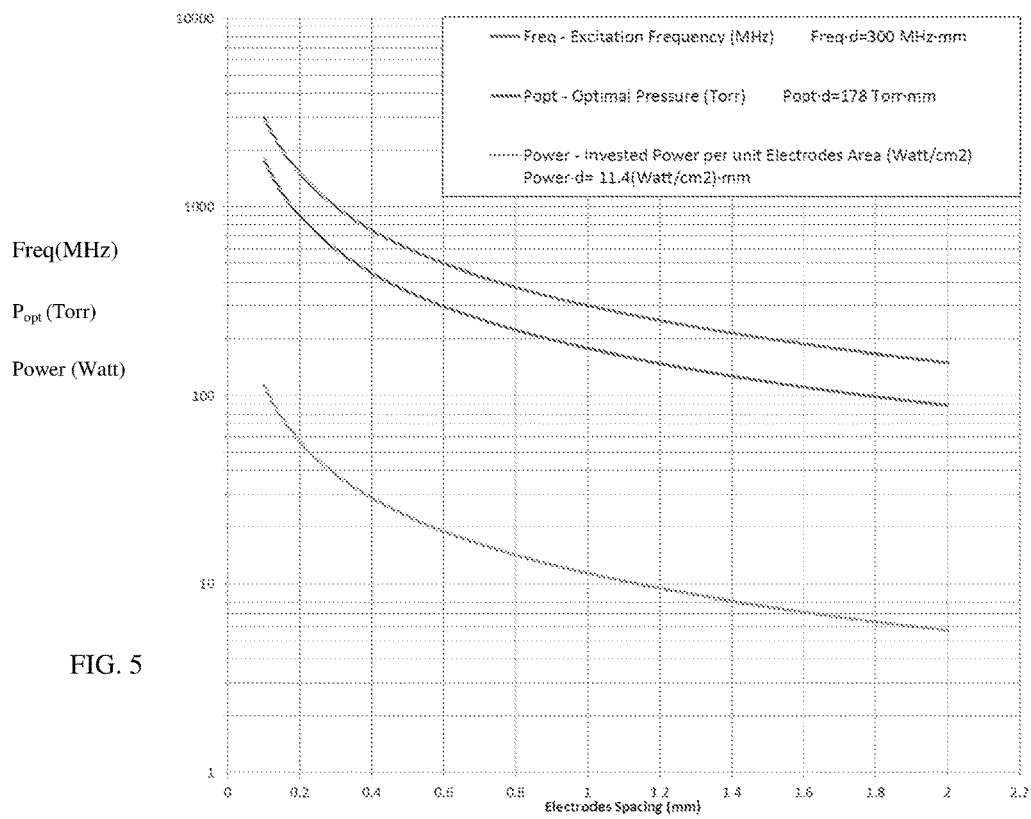
FIG. 5 is a simplified illustration of scaling factors for parameters of a $CO_2$ laser discharge composed of the following gas mixture: $N_2:CO_2:He=1:1:8$

FIG. 5 shows the scaling factors of the optimal values for the pressure, excitation frequency and allowable power load per unit electrodes area.

It is clear that reducing the electrode spacing will be beneficial for increasing the power load and the output laser power. The present invention enables such power scaling.

In addition, the higher gas mixture pressure enables gaining higher laser stability than prior art lasers, due to the increased pressure broadening in the laser spectra, which in turn, increases the amount of longitudinal lasing modes that are involved and reduces the mode-hopping phenomenon.

The higher gas pressure, in a pulsed laser configuration, achieves shorter pulse durations and higher peak powers than the prior art, which is of high interest for laser applications such as material processing.

Figure 6:
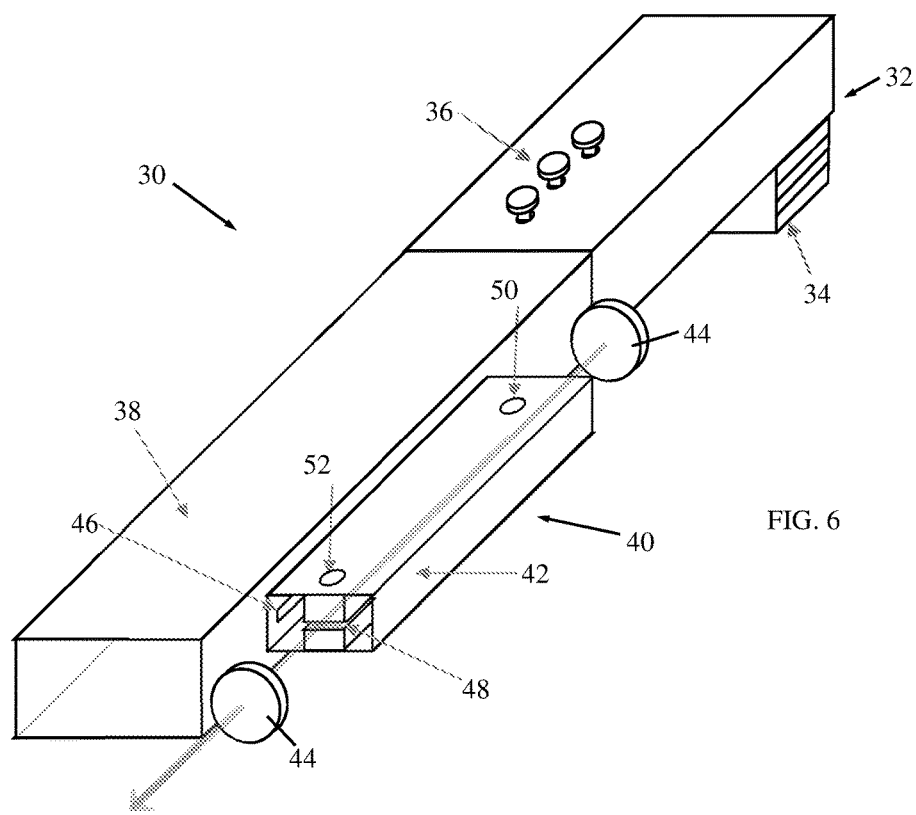
FIG. 6 is a simplified illustration of structure of a microwave-excited gas slab laser, constructed and operative in accordance with an embodiment of the invention.

An embodiment of a laser 30 employing a small electrode gap and microwave excitation is illustrated in FIG. 6.

The laser 30 may include three sections. The first section is a microwave launch portion 32, which may include a microwave source 34, such as but not limited to, a commercial 2.45 GHz magnetron, and an impedance matching unit 36, such as but not limited to, a stub tuner composed of 3 tuning screws.

A second section is a microwave resonator 38 which allows for the buildup of high power microwave energy. The resonator cavity may be a closed rectangular waveguide having a longitudinal field distribution which is as homogeneous as possible, for achieving homogeneous laser plasma in the laser head for efficient laser operation.

Figure 7:
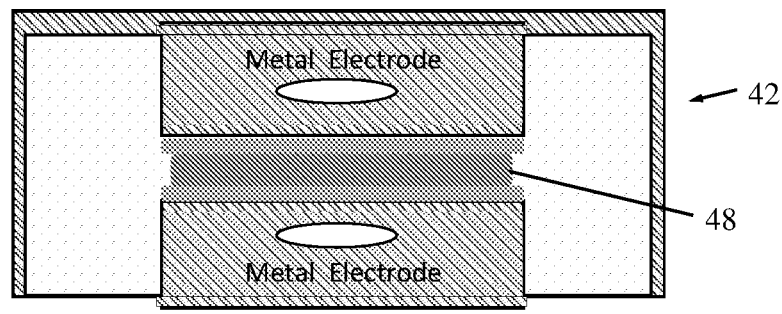
FIG. 7 is a simplified illustration of laser head cross section in the middle of the laser head, in accordance with an embodiment of the invention.

A third section is a laser head 40. The laser head 40 may be built from a ridge waveguide 42, which allows for high microwave field in the narrow of the ridge. Due to this special characteristic, the discharge takes place only in this section of the ridge waveguide 42. A cross section of the ridge waveguide 42 is illustrated in FIG. 7.

The ridge waveguide 42 may be made of a metal frame. Two middle metal ridges in the metal frame may be used for gaining a high electric field between the ridges and as a result to an electric discharge between the ridges. The ridge waveguide 42 may include two ceramic planar sheaths (electrodes or stripes) as described above with reference to FIG. 3A or 4. These ceramic sheaths enable high transmission of the laser guided waves within the laser plasma section, formed in a hollow planar waveguide whose width is a fraction of a millimeter. These sheaths can be made of polished and lapped ceramic material with a refractive index lower than 1 at the laser wavelength for assuring true guided modes in the laser waveguide. As described above, for example, for a $CO_2$ laser operating at a wavelength of 10.6 μm, these ceramic material may be, but not limited to, $Al_2O_3$ or BeO, both with a refractive index lower than 1 @ 10.6 μm ($n_{Al2O3}$=0.67-i0.035 and $n_{BeO}$=0.0542.4). Alternatively, the ceramic material may be composed of, but not limited to, an alternating layers of $Al_2O_3$ and Ge, forming a band-gap structure at the laser wavelength, which does not allow for the laser to penetrate the dielectric material and as a result low propagation losses are achieved.

The sheaths serve as stabilizing agents for the laser plasma against filamentation, caused by plasma instabilities such as thermal instabilities. Since narrowing an electric discharge to 100-400 μm requires the RF excitation frequency to be in the MW range of 1-5 GHz, the depletion layers width in the plasma between the electrodes is of the order of 10-20 μm for this excitation frequency. These narrow depletion layers are in certain cases too narrow to allow for stable discharge and additional dielectric layers in the form of the mentioned ceramic sheaths are required.

Laser mirrors 44 may be mounted at the ends of the ridge waveguide 42. One mirror 44 may be a fully reflective mirror and the other a partially reflective mirror, through which the laser beam is emerged.

The ridge waveguide 42, forming the laser head, is attached to the MW cavity in a way that allows for the MW energy to be efficiently coupled from the MW cavity to the ridge waveguide. An efficient coupling between the MW cavity and the ridge waveguide may be achieved by forming a coupling slit 46 between the MW cavity and the ridge waveguide 42, as shown in FIG. 6. The laser discharge 48 of the ridge waveguide 42 is shown in FIG. 6. Cooling liquid inlet 50 and outlet 52 may be provided for cooling liquid to circulate in the laser device.

In order to have an efficient MW to plasma energy transfer, the conduction losses of the walls in the MW cavity are preferably minor compared to the plasma MW energy absorption. The efficiency of this energy transfer is measured by the following relation:

$$MW_{eff} = \frac{1}{Q_{pl}(Q_{pl}^{-1} + Q_{cv}^{-1})},$$

where $Q_{pl}$ is the Q-factor of the cavity in the presence of laser plasma and $Q_{cv}$ is the Q-factor of the cavity without laser plasma (affected mainly by the cavity walls conduction losses). It is clear from the above relation that $Q_{pl} \ll Q_{cv}$ is required for reaching high $MW_{eff}$. Therefore the microwave cavity and laser head may be constructed from highly conductive material at the microwave wavelength. Such material may be, but is not limited to, copper.

An additional feature of the microwave cavity is that the longitudinal distribution of the electric field in front of the coupling slit to the laser ridge waveguide is preferably as homogeneous as possible. This ensures having a longitudinally homogeneous laser plasma, so that the laser efficiency is high and there are no high field regions along the discharge plasma, in which instability may evolve and create damage or deteriorate the laser performance.

Such homogeneous field distribution may be achieved for example by choosing a microwave cavity made of, but not limited to, a rectangular waveguide with a long guided wavelength (kg). This waveguide wide dimension (as in FIG. 6) may be close to half the microwave wavelength for achieving this goal. In other words, the waveguide constructing the microwave cavity may be close to cut-off. The length of the microwave cavity may also be larger than the ridge waveguide, for achieving a homogeneous field distribution along the ridge waveguide, in which the electric discharge takes place.

Accordingly, the launch system may be constructed of a microwave source, which may be, but not limited to, a magnetron. The magnetron is attached to a microwave waveguide, which may be, but not limited to, a rectangular waveguide.

The microwave launch waveguide may also contain an impedance matching unit for allowing an efficient microwave energy transfer from the magnetron to the microwave cavity. Such an impedance matching unit may be, but not limited to, a stub tuner, composed of a microwave waveguide with three stub screws, that allow for changing the waveguide impedance to a value that matches that of the microwave cavity containing the laser discharge plasma. At this point the stub screws are fixed, assuring that the microwave energy is being efficiently transferred to the microwave cavity.

The laser gas mixture is contained in the ridge waveguide, which may be very well sealed. The electric discharge forming the laser plasma takes place at the ridge section only, where the highest electric field in the ridge waveguide is present. The ridge section containing the plasma may be cooled, for example, by cooling ducts drilled in the metal ridge section, in which cooling liquid is flowing. Another possibility is air cooling, in which efficient heat sinks are mounted on one or two of the ridge sections, allowing for an efficient heat flow from the discharge plasma to the surrounding environment. The laser plasma creates a gain at the relevant laser wavelength and the laser cavity, formed by the laser mirrors at the ends of the ridge waveguides, allows for the amplification of the laser radiation, which finally is being ejected from the output coupler side of the laser head.

Figure 8:
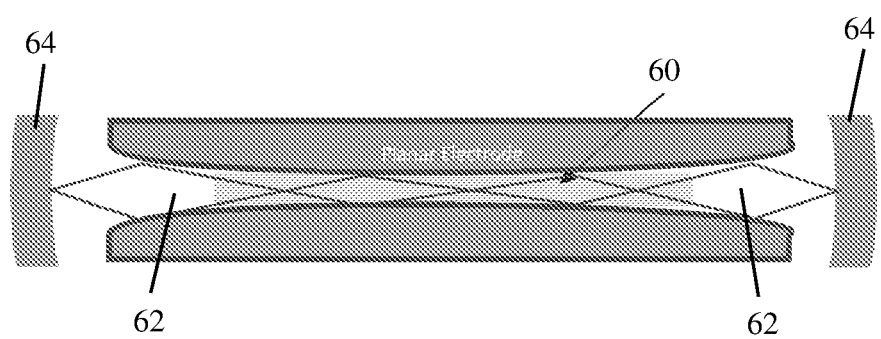
FIG. 8 is a simplified illustration of adiabatic tapering of the waveguide slit for avoiding coupling losses, in accordance with an embodiment of the invention.

When a narrow slit is applied (<0.5 mm), the emerging optical radiation may suffer high coupling losses from the narrow slit to the optical mirror situated in front. It is well known to those skilled in the art that such coupling losses are proportional to $1/d^3$, where d is the electrodes gap (Degnan J. J. The Waveguide Laser: A Review, Appl. Phys., 1976, v. 11, p. 1-33). In order to avoid coupling losses, it is required to increase the electrodes gap in front of the optical mirror. In one embodiment of the present invention, there is a gradually adiabatic increase in the electrodes gap from that of the discharge (<0.5 mm, indicated by reference numeral 60) to ~2 mm (indicated by reference numeral 62) in the direction of end mirrors 64, as shown in FIG. 8.

The adiabatic tapering of the planar waveguide maintains the beam parameters (beam quality and profile), while increasing the guided mode width dimensions in the transverse plane (perpendicular to the waveguide plane). As the mode reaches the waveguide end, its width dimensions are in the order of several mm, allowing for negligible coupling losses of the radiation traveling back from the mirror situated in front of the waveguide edge.

Therefore, combining microwave excitation of gas lasers with a one dimensional photonic band-gap structure, forming the dielectric sheaths that confine the small discharge gap, or using a dielectric material with low loss and a refractive index lower than 1 at the laser wavelength, will allow for more than an order of magnitude higher laser power per unit electrodes area of a diffusion cooled gas lasers. In addition, moving to efficient commercial MW sources will reduce the size and price of the laser source and markedly increase its overall efficiency.

What is claimed is:

1. An MW excited gas slab laser comprising: a laser head comprising a MW cavity comprising a hollow slab waveguide that includes dielectric layers between which electric discharge in a lasing gas takes place, wherein an optical gain medium formed by said electrical discharge is confined within said hollow slab waveguide, and wherein said dielectric layers form a photonic band-gap structure at a laser gain wavelength, or wherein said dielectric layers have refractive indices lower than 1 at the laser gain wavelength; where the width of the hollow slab between the dielectric layers is equal to or smaller than 0.5 mm; wherein said photonic band gap structure forming the dielectric layers is made of alternating layers of Ge and Al2O3.

2. The laser according to claim 1, wherein said electric discharge is excited by a high power MW source in the frequency range of 1 GHz-5 GHz.

3. The laser according to claim 2, where said MW source is a magnetron.

4. The laser according to claim 1, where the lasing gas within which the electric discharge takes place is a mixture of $CO_2$ laser made of He, $N_2$, $CO_2$ and Xe.

5. The laser according to claim 1, where the lasing gas within which the electric discharge takes place, is a mixture of CO laser made of He, $N_2$, CO and Xe.

6. The laser according to claim 1, wherein said dielectric layers comprise $Al_2O_3$.

7. The laser according to claim 1, wherein said dielectric layers comprise BeO.

8. The laser according to claim 1, wherein said electric discharge is excited by an MW source, and a stub tuner is provided for impedance matching between the laser head and the MW source.

9. The laser according to claim 1, wherein said electric discharge is excited by an MW source, and an E-H tuner is provided for impedance matching between the laser head and the MW source.

10. The laser according to claim 1, wherein said waveguide is comprises within a ridge waveguide.

11. The laser according to claim 10, wherein the MW energy stored within the said MW cavity is coupled to said electric discharge embedded within said ridge waveguide by a coupling slit between said MW cavity and said ridge waveguide.

12. The laser according to claim 10, wherein the MW energy stored within the said MW cavity is coupled to said electric discharge embedded within said ridge waveguide, where the said ridge waveguide is comprised within the MW cavity.

13. The laser according to claim 10, wherein Q-Factor of structure including the MW cavity and the ridge waveguide without laser plasma is higher than Q-Factor of the structure including the MW cavity and the ridge waveguide with laser plasma.

14. The laser according to claim 13, comprising laser mirrors that form a stable laser cavity configuration.

15. The laser according to claim 13, comprising laser mirrors that form a hybrid stable and unstable laser cavity configuration, where the stable cavity is formed at a narrow dimension and the unstable cavity is formed at the wide dimension.

16. The laser according to claim 1, where the laser cavity is formed by laser mirrors placed at both ends of the ridge waveguide, encompassing the said gain medium created by the said electric discharge.

17. The laser according to claim 1, where the spacing between said dielectric layers is adiabatically tapered up at waveguide ends for avoiding out-coupling losses.

* * * * *